US008086492B2

(12) United States Patent
Ashbaugh (10) Patent No.: US 8,086,492 B2
(45) Date of Patent: Dec. 27, 2011

(54) FRAME-BASED NETWORK ADVERTISING AND EXCHANGE THEREFOR

(75) Inventor: Douglas Ashbaugh, Nokomis, FL (US)

(73) Assignee: Douglas Ashbaugh, Nokomis, FL (US)

( * ) Notice: Subject to any disclaimer, the term of this patent is extended or adjusted under 35 U.S.C. 154(b) by 1542 days.

(21) Appl. No.: 11/086,283

(22) Filed: Mar. 23, 2005

(65) Prior Publication Data

US 2005/0216342 A1     Sep. 29, 2005

Related U.S. Application Data

(60) Provisional application No. 60/555,411, filed on Mar. 23, 2004, provisional application No. 60/555,412, filed on Mar. 23, 2004.

(51) Int. Cl.
*G06Q 30/00* (2006.01)
(52) U.S. Cl. ............... 705/14.73; 705/14.15; 705/14.4; 705/14.41; 705/14.49
(58) Field of Classification Search .................. 705/14
See application file for complete search history.

(56) References Cited

U.S. PATENT DOCUMENTS

| | | | |
|---|---|---|---|
| 5,848,396 A | 12/1998 | Gerace | |
| 2003/0078833 A1 | 4/2003 | Suzuki et al. | |
| 2003/0163372 A1* | 8/2003 | Kolsy | 705/14 |
| 2004/0163101 A1 | 8/2004 | Swix et al. | |
| 2004/0167928 A1* | 8/2004 | Anderson et al. | 707/104.1 |
| 2005/0216335 A1 | 9/2005 | Fikes et al. | |

FOREIGN PATENT DOCUMENTS

| | | |
|---|---|---|
| GB | 2379061 A | 11/2001 |
| WO | WO /0182156 | 11/2001 |

OTHER PUBLICATIONS

Guidelines for the graphical interface.(embedded computer), Bertholdt, Joerg, Electronic Engineering Times , p. 103, Nov. 8, 1999, ISSN: 0192-1541.*
The International Search Report and the Written Opinion of the International Searching Authority for Application No. PCT/US06/45039, dated Jun. 24, 2008.

* cited by examiner

*Primary Examiner* — John G. Weiss
*Assistant Examiner* — Victoria Vanderhorst
(74) *Attorney, Agent, or Firm* — David Lewis; Marc Edward Arkin (57) ABSTRACT

Advertising is displayed in conjunction with web pages and other HTML-rendered information by splitting a display area into frames, so that requested content appears in one frame and one or more advertisements appear in other frames, respectively. By displaying advertisements in frames that are at the same logical layer as the web pages that induced the advertising, the functionality of the presentation resides in native HTML code, making it much more difficult to block the advertisement. An exchange server provides frame generation data to the HTML-rendering device. The device can directly obtain requested content and associated advertisements from respective domains, or the data can be indirectly provided through the exchange server.

20 Claims, 5 Drawing Sheets

FRAME-BASED NETWORK ADVERTISING AND EXCHANGE THEREFOR

Priority is claimed from Provisional U.S. Application Nos. 60/555,411 and 60/555,412 filed Mar. 23, 2004, the disclosures of which are incorporated herein by reference.

FIELD OF THE INVENTION

The present invention is directed to the display of information via a network, such as the Internet, and more particularly to the presentation of advertising in conjunction with the display of associated content.

BACKGROUND OF THE INVENTION

For many services that deliver information to viewers, such as newspapers, magazines and broadcast television, advertising is an integral component of the business model that supports the cost of delivering the information. The same holds true for information services that are provided via the Internet. Some of the mechanisms that are employed to present advertising via the Internet include banners and pop-up windows that appear within a user's browser. One of the limitations associated with these mechanisms, however, is the fact that they can be readily blocked by various software tools, as a result of which the user never sees the advertising. Consequently, Internet advertising which employs these heretofore known techniques is not as effective as more persistent advertising that appears in print media or the like.

The present invention provides an alternative mechanism for the presentation of advertising via electronic media, that thwarts efforts to block the advertising.

DETAILED DESCRIPTION

To facilitate an understanding of the principles upon which the present invention is based, exemplary embodiments are described hereinafter with reference to a user viewing information provided over the Internet, by means of a browser running on a personal computer. However, the practical implementations of the invention are not limited to these embodiments. For example, the technology that presents the information to the user need not be a web browser. Rather, it can be any device that has the ability to render information that is formatted according to the HTML standard, such as a personal digital assistant (PDA), cellular telephone, or the like. Accordingly, the embodiments described hereinafter should be viewed as illustrative, and not limiting in any manner.

Figure 1:
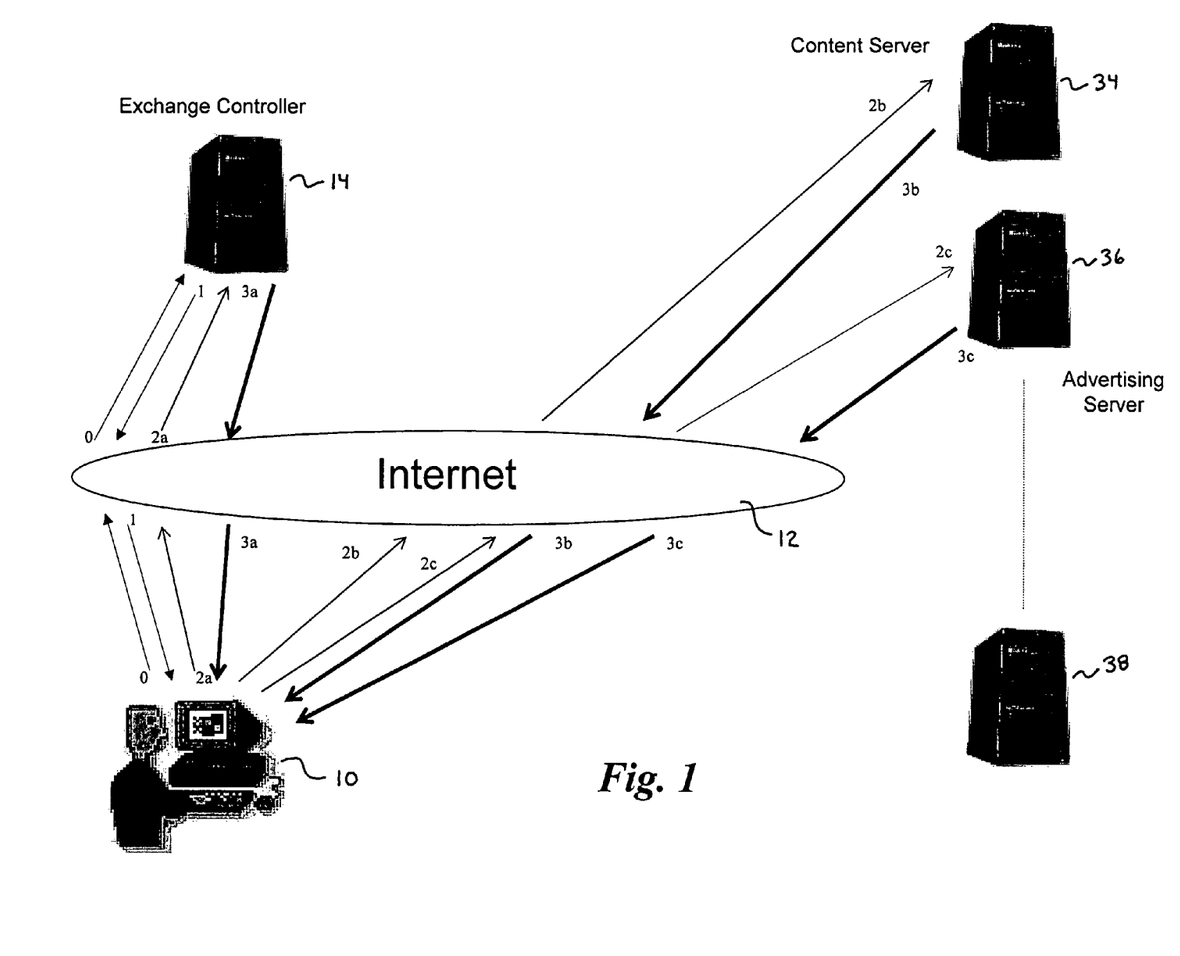
FIG. 1 is a schematic representation of a first embodiment of a network exchange for the presentation of information and related advertising in accordance with the present invention.

FIG. 1 is a schematic representation of a network advertising exchange that can be employed to implement the principles of the present invention. A user at a personal computer 10 that is running a browser application may enter a uniform resource locator (URL) in the browser, or click on a link displayed in the browser, to request a web page. As an alternative to a user action, the request for the web page could be initiated by other stimuli. For example, an embedded script or an embedded object within a page currently being viewed could automatically initiate the request for a new web page. The request is transmitted via a network 12, such as the Internet, to a server associated with the URL. In the illustrated embodiment, the server comprises an exchange controller 14. The transmission of the request from the personal computer 10 to the server 14, via the Internet 12, is represented by the arrows labeled "0".

Figure 2A:
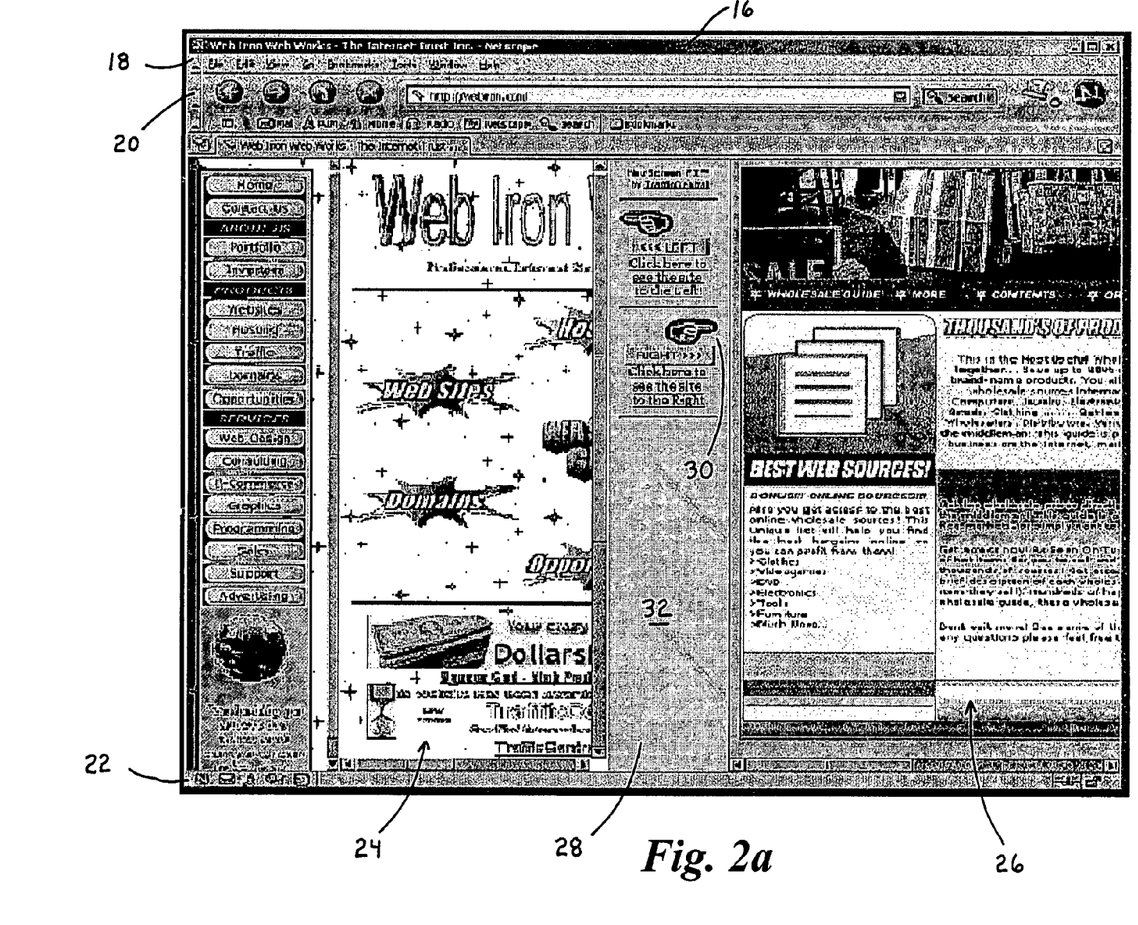
FIGS. 2a and 2b are illustrations of browser windows that are divided into frames to present both content and advertising in accordance with one implementation of the present invention.

In response to this request, the server 14 transmits a frame generation stream to the personal computer 10, as represented by the arrows "1". This frame generation stream comprises HTML code that causes the browser to display a window that comprises one or more frames. An HTML frame is a window, or portion of a window, that allows multiple views to be concurrently presented in such a manner that the information in one view remains visible while other views are scrolled or replaced. The frame generation stream 1 indicates the structure of the frames within the display area of the browser window, and identifies the content that is to fill each of the frames. Examples of HTML code for frame generation streams are presented below. In the first example, the display area of a window is split vertically, to present frames that are arrayed across the width of the display area, as shown in FIG. 2a.

```
<FRAMESET COLS="50%,85,*" FRAMEBORDER="YES" BORDER="0"
FRAMESPACING="0"
ROWS="1">
<FRAME NAME="leftFrame1111070204" SCROLLING="YES" noresize
SRC="prot://siteA.com/">
<FRAME NAME="navFrame1111070204" SCROLLING="NO" noresize
SRC="prot://www.Site14.net/popsitenavscrn2.php?website=prot://www.siteB.info
&original=prot://siteA.com/">
<FRAME NAME="rightFrame1111070204" SCROLLING="YES" noresize
SRC="prot://www.siteB.info">
</FRAMESET>
```

Figure 2B:
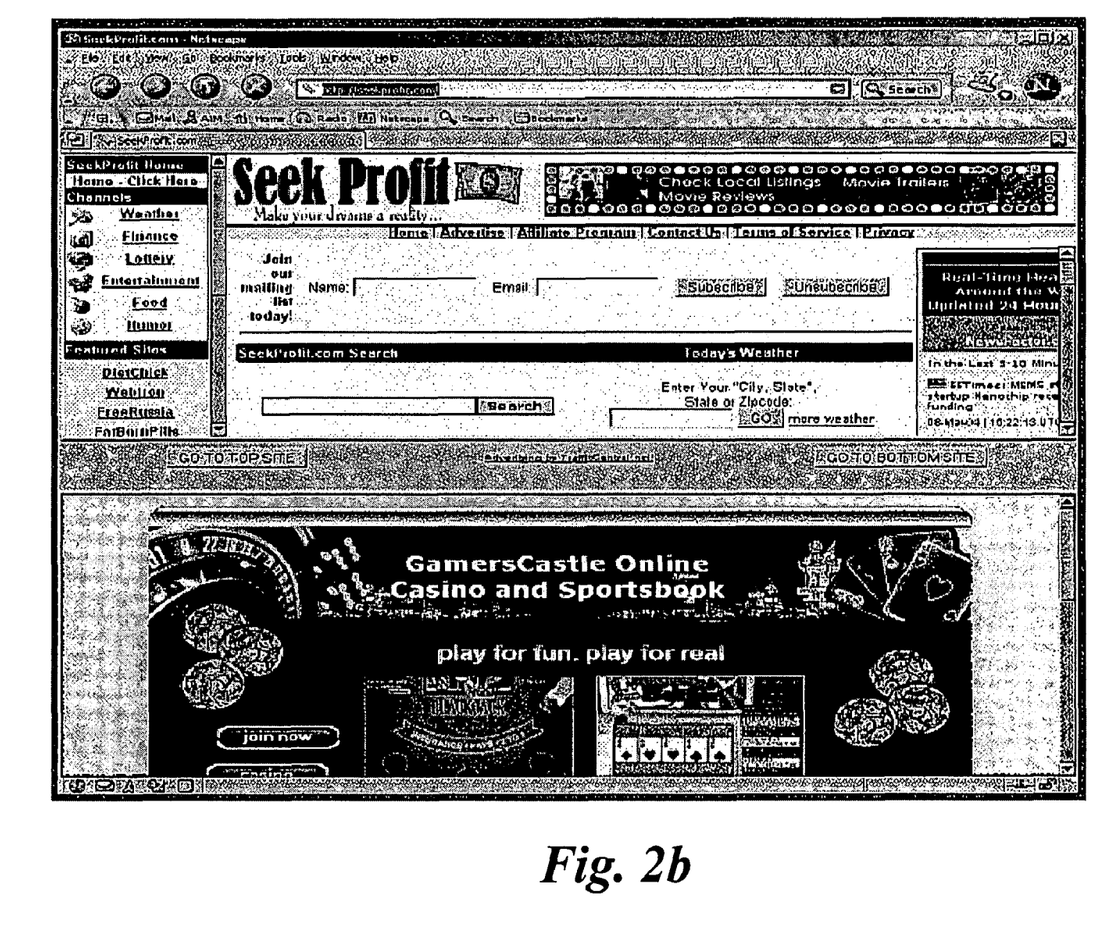

In the second example, the display area is split horizontally, to present vertically stacked frames as shown in FIG. 2b.

```
<FRAMESET ROWS="50%,48,*" BORDER="0" FRAMEBORDER="YES"
BORDER="1"
FRAMESPACING="0">
<FRAME
SRC="prot://siteA.com/"
NAME="topFrame1111070160" SCROLLING="YES" NORESIZE>
<FRAME NAME="navFrame1111070160" SCROLLING="NO" NORESIZE
SRC="prot://www.Site14.net/navscreenfx/navfxh0.php?original=prot://siteA.com/&
f1=topFrame1111070160&f2=botFrame1111070160&website=prot://siteB.net">
<FRAME
SRC="prot://siteB.net"
NAME="botFrame1111070160" SCROLLING="YES" noresize>
</FRAMESET>
```

In the foregoing examples, the term "prot" represents the protocol that is used for the communications, e.g. http.

FIG. 2a illustrates an example of a vertically split window that might be displayed in response to the first example of a frame generation stream presented above. As is conventional, the window typically includes a title bar 16, as well as one or more menu bars 18, tool bars 20 and/or status bars 22, which might be selectively enabled or disabled by the user or through programming. The remainder of the window constitutes the display area. In the example of FIG. 2a, the display area is divided into three frames that are oriented in a columnar format. The left frame 24 displays content associated with the web page that was requested by the user or one of the other stimuli described previously. In the first example of the frame generation stream presented above, the URL for this page is identified by the "SRC" tag. In the example, the content of the frame 24 is associated with the domain "SiteA.com".

The request for the desired content, or the subsequent display thereof, induces concurrent display of advertising, pursuant to an arrangement with the owner of the content page. Depending upon the business model, the stimuli to present the advertising could be applied by the content page, or it could be authorized by the content page owner allowing third party stimuli to trigger the generation of the frames. The subject matter appearing in the advertising could be related to the information in the content page, or it could be entirely distinct.

The right frame 26 displays the advertising that is authorized by or induced by the content page, as provided from the domain "SiteB.info". The middle frame 28 in the illustrated example comprises a navigation frame, provided from a third domain, "Site14.net". This navigation frame includes control buttons or hypertext links 30 that can be clicked by the user to cause the content displayed in the left frame 24 or the right frame 26 to appear in a separate window. The middle frame 28 also provides an area 32 that can be used to display additional advertising or multimedia entertainment, e.g. video.

It will be appreciated, of course, that the navigation frame 28 is optional. The concurrent display of content and advertising in a single window can be implemented with as few as two frames, one of which displays the requested content and the other of which displays the advertising. Furthermore, the locations of the primary content frame and the primary advertising frame can be swapped. Likewise, the relative sizes, styles and shapes of the frames can be varied to any extent supported by the HTML specification.

Returning to FIG. 1, the illustrated embodiment depicts one approach for retrieving the content that is to appear in each of the respective frames 24, 26 and 28. In this embodiment, the information that is displayed in the frames is provided by three respective network resources, e.g. servers. For ease of understanding, the three servers are illustrated in the figures as being implemented on three different physical devices, respectively. It will be appreciated, however, that any two or more of the servers can be resident on the same machine. In the context of the present invention, therefore, the term "server" refers to a process running on a machine, as opposed to the machine itself. The separation between servers is a logical one, i.e. they are each associated with a different domain name, and may or may not be physical as well.

The features of the navigation frame 28 might be provided by a server at the same exchange controller 14 that returned the frame generation stream. For this case, upon receipt of the frame generation stream, the personal computer 10 sends a first request 2a to the exchange controller 14. This request comprises the URL associated with the appearance of the navigation frame 28. In response, the exchange controller 14 returns the appropriate HTML code in a message 3a, to generate the appropriate display of the navigation frame 28 within the window. Of course, the information pertaining to the navigation frame could be provided by a server that is not executing on the exchange controller 14.

The information for the content frame 24 is provided by a content server 34 that is associated with the website requested by the user. In response to receiving the URL for this website in the frame generation stream 1, the personal computer 10 sends a request 2b containing the URL to the server 34. In a similar manner, the personal computer 10 sends a request 2c to an advertising server 36 that provides the advertising information that appears in the advertising frame 26. In response to these requests, the content server 34 sends a message 3b containing the HTML code for the content to appear in the frame 24, and the advertising server 36 transmits a message 3c containing the HTML code for the advertisement appearing in the frame 26.

While the example of FIG. 2a employs three frames, it will be appreciated that the display area can be divided into any desirable number of frames. For example, the owner of the website that provides the content appearing in the frame 24 may have agreements with three different advertisers. In such a case, the right portion of the display area might be divided into three, vertically stacked frames, each of which displays a separate advertisement. In this case, the advertisement in each of the three frames might be provided by a single advertising server 36, or multiple respective advertising servers 36, 38, etc.

The use of a frame to present advertising provides a number of advantages. As discussed previously, prior techniques for displaying advertising typically employed browser-based scripting language to generate new logical layers for the ad space, e.g., items with new windows or stacking order considerations, pop-up windows, or HTML divisions or layers. As a result, it became easy to separately identify and intercept the scripting or layers associated with advertisements, and block them from being displayed. In contrast, by using a frame to display the advertising, the code that is sent to the rendering device, e.g. browser, is native to the HTML core language specification, and operates without developing a new layer of software. As such, it becomes significantly more difficult to prevent the display of advertising. In order to do so, it would become necessary to change the international language specification for HTML, to support disabling the display of frames.

The frame-based advertising allows for display of multiple full HTML document content in simultaneously presented frames and is not limited to rendering single HTML documents. This form of advertising is not limited to display of specific incremental entities, such as images or custom multimedia objects, as found in the other traditional forms of Internet advertising. The approach described herein displays any properly formatted HTML content document in total in each frame, which can include any number of device-supported incremental entities. Advertising by frames provides complete transparency to the content that is actually rendered inside each of the frames. In addition, there is no special programming required to support the presentation of full HTML documents in each ad frame, since it is part of the core HTML language. Utilizing the techniques of the present invention, browser-based scripting is not necessary to induce the display of advertising. In fact, a web browser scripting interpreter/processor can be disabled, and the advertising will still appear.

Since the advertising frame appears at the same logical layer as the web page that originally induced the advertising, the display of the advertisement is more persistent. As a result, the user is likely to spend more time looking at the original website and the advertisement in conjunction, because of the manner in which they are presented.

Figure 3:
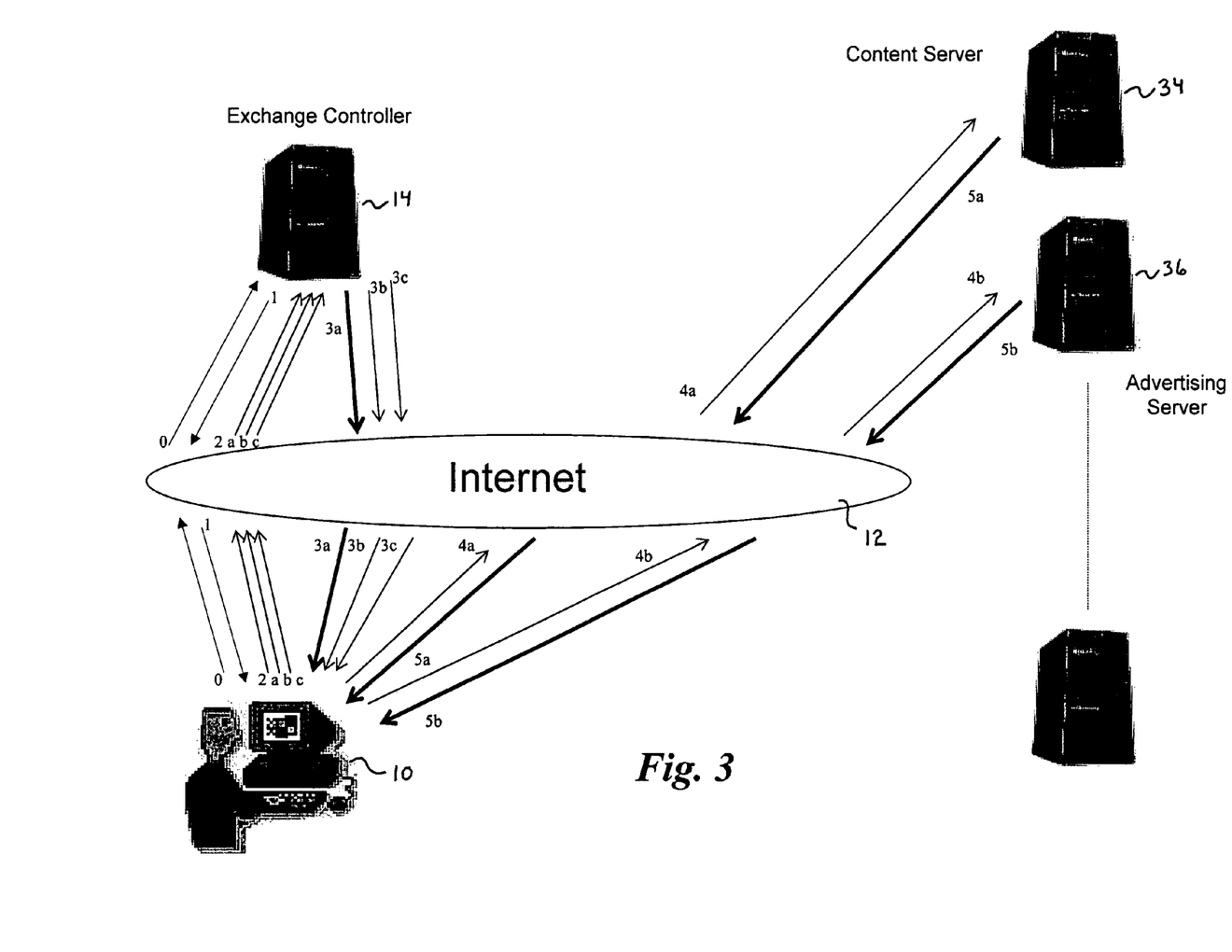
FIG. 3 is a schematic view of a second embodiment of a network exchange in accordance with the present invention.

In the example of FIG. 1, once the frame generation stream is received from the exchange controller 14, the browser or other HTML-rendering device directly transmits requests to the respective servers that provide the content to appear in each of the frames. It has been found that certain implementations of HTML rendering technologies are not well-suited to perform this operation in a robust manner. To circumvent technical difficulties presented by these types of technologies, an indirect approach can be employed to obtain the appropriate content. An example of this approach is illustrated in FIG. 3. In the indirect approach, the initiation of the process begins in the same manner, with the transmission of a request "0" from the personal computer 10 to the server 14, and the return of a frame generation stream from the server 14 to the personal computer 10. In this case, however, the HTML code of the frame generation stream does not contain the URLs that are directly associated with the content server 34 and advertising server 36. Rather, in the illustrated embodiment the URLs that pertain to the content of the frames are each associated with the exchange controller 14. Thus, for instance the SRC tag for the left frame 24 in the example of FIG. 2 might appear as "prot://www.Site14.net/popsite.php?website=prot://SiteA.com/", where Site14.net is a domain associated with the exchange controller 14. A similar type of tag can be employed for the right frame 26.

In the example of FIG. 3, therefore, each of the messages 2a, 2b and 2c is transmitted to the exchange controller 14. As in the example of FIG. 1, if the exchange controller 14 is the provider of the content for the navigation frame 28, this content can be directly returned to the personal computer 10, in the form of message 3a. In response to the other two requests, 2b and 2c, the exchange controller 14 transmits HTML header redirect requests to the browser on the personal computer 10. These header redirect requests are represented as messages 3b and 3c in the example of FIG. 3.

It should be noted that the URLs associated with the exchange controller 14 can be directed to multiple parallel exchange controllers for scalability, reliability, and performance. Examples of such an implementation would be to workload balance the exchange server 14 through available and current technologies or methods such as High-Availability Clustered Multiprocessor (HACMP) solutions or simple DNS rotation appliances, or other workload balancing schemes and devices currently available. In a more direct manner, the initial exchange controller could programmatically direct the base URLs in the frame generation stream 1 to alternate known exchange servers at the time of generation.

Briefly, the "redirect" feature of the HTTP protocol provides redirection status codes that a server can employ to indicate to a browser that it should look for a desired page at another URL. This other URL is specified in the "Location" HTTP header. Therefore, in the example of FIG. 3, messages 3b and 3c contain redirection status codes and Location headers that identify the URLs associated with the content server 34 and advertising server 36. Upon receiving these header redirect messages, the browser on the personal computer 10 sends new requests 4a and 4b to the content server 34 and advertising server 36, in accordance with the URLs in the Location headers of the messages 3b and 3c, respectively. In response, the servers 34 and 36 return the desired content for the content frame 24, and the advertisement data for the advertising frame 26, respectively. Thus, as long as the browser, or other HTML-rendering device, supports HTML header redirects, the appropriate information will appear in the respective frames of the display area.

Of course, it is possible to use techniques other than HTML header based redirection to implement the indirect approach. For instance, browser side scripting might be employed. In such a case, a script can be employed to initiate the construction of the frames locally at the browser. It then becomes possible to initiate a "window.location=" construct in the script, to perform the redirection instead of an HTML header redirect. In this situation, however, a scripting language must be enabled.

Figure 4:
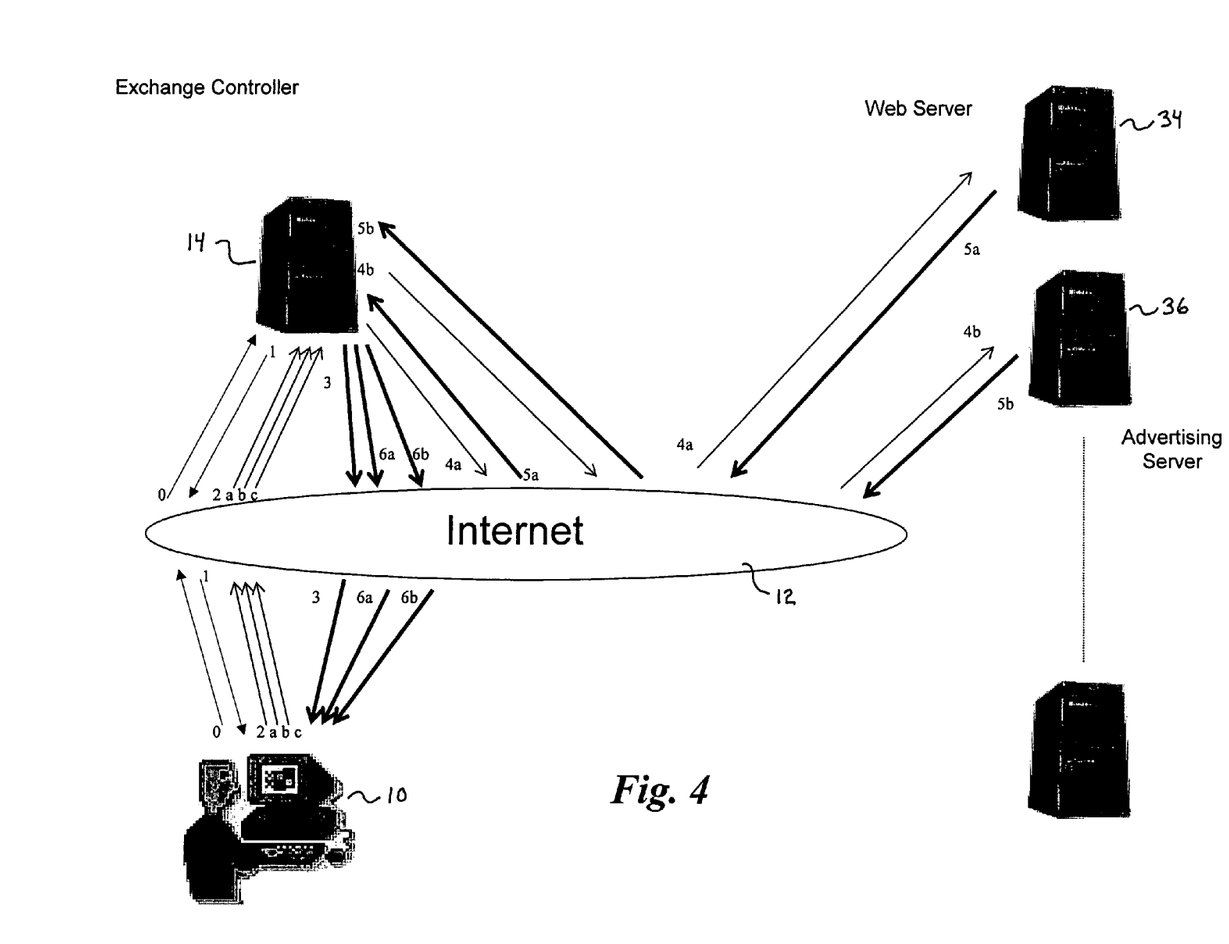
FIG. 4 is a schematic representation of a third embodiment of a network exchange in accordance with the present invention.

The embodiments of FIGS. 1 and 3 utilize http as the protocol for communications with the content delivery servers. Another indirect approach that supports other protocols is illustrated in FIG. 4. In this embodiment, the exchange controller 14 plays an active role in retrieving and providing the content to the browser running on the personal computer 10. As in the example of FIG. 3, when the browser receives the frame generation stream in the message 1, it sends three requests 2a, 2b and 2c to the exchange controller 14. In response to request 2a, the exchange controller supplies the content for the navigation frame directly to the browser, via the message 3. In response to requests 2b and 2c, the exchange controller 14 sends requests 4a and 4b to the web server 34 and advertising server 36, respectively. These two servers return the appropriate content for the respective frames to the exchange controller 14, by way of messages 5a and 5b. Upon receipt of these messages, the exchange controller then provides the content to the browser on the personal computer 10, via messages 6a and 6b.

In this embodiment, the exchange server 14 can use an alternative protocol, such as UDP, and TCP socket level communication to retrieve the desired content and advertisements from other servers. The servers that it connects to can be the endpoint content delivery servers, or intermediate exchange servers. Once the exchange server 14 receives the requested HTML streams from the other servers via any of a suitable number of supported protocols, it then forwards the entire stream to the browser on the personal computer 10 by means of the open http connection between them.

One of the optional attributes for a frame is a name. In the examples of frame generation streams given previously, the content frame 24, navigation frame 28 and advertising frame 26 are given the names "leftFrame1111070204", "navFrame1111070204" and "rightFrame1111070204", respectively. In each of these frame names, the value "1111070204" is a randomly generated number. A new random number is produced each time a frame generation stream is transmitted. The use of a randomly generated number for the frame name further thwarts efforts to block advertisements. For instance, once the use of frames to present advertising becomes known, some tools may attempt to block frames having a names associated with an advertiser. By changing the names of the frames with random numbers or other forms of randomized text strings, such blocking efforts are rendered ineffective. The textual portion of each frame name, e.g. "leftFrame", can be static, or it can also be randomly varied with each new frame generation stream.

From the foregoing, therefore, it can be seen that the present invention provides a mechanism for presenting advertising over the Internet and other network-based computer systems that is much less susceptible to being blocked than other known techniques for doing so. By displaying advertisements in frames that are at the same logical layer as the web pages that induced the advertising, the functionality of the invention resides in native HTML code, making it much more difficult to separate the advertisement from the associated content.

It will be appreciated by those skilled in the art that the present invention can be embodied in other specific forms without departing from the spirit or essential characteristics thereof, and that the invention is not limited to the specific embodiments described herein. For instance, while embodiments of the invention have been described with reference to the presentation of advertising in a browser window on a personal computer, the principles are equally applicable to the display area of any suitable HTML-rendering device. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A method for presenting advertising information on a device in conjunction with requested data, the method comprising:

in response to a request to display said data, a server having a processor and an interface to a network, sending information causing a dividing of a display area on said device into a plurality of frames;

retrieving, by the server, the requested data from a network resource and sending information causing the displaying on said device of said data in one of said plurality of frames, intended for displaying content, to form a content frame; and retrieving, by the server, advertising from an advertising server and sending information causing the displaying of said advertising in another one of said plurality of frames, intended for displaying advertising to form an advertising frame; and sending, by the server, information causing the filling of yet another of said plurality of frames, intended for navigation, with navigation tools that are displayed, on the device, to form a navigation frame that is different from the advertisement frame and content frame, where the navigation frame is displayed within the display area in a manner visible to a user that enables the user to selectively display the data in said first frame and the advertising in said second frame in response to the user's interaction with one or more visible elements of the navigation frame provided to make a selection.

2. The method of claim 1, wherein said device is an web page rendering device.

3. The method of claim 2, wherein said display area comprises a window generated by a browser application.

4. The method of claim 1, wherein said network resource comprises a server that is distinct from said advertising server.

5. The method of claim 4, wherein each of said servers are respectively associated with different domain names on the network.

6. The method of claim 5, wherein said servers comprise processes that execute on the same physical machine.

7. The method of claim 5, wherein said servers comprise processes that execute on different respective machines.

8. The method of claim 1, receiving an indication that one or more visible elements of the navigation frame was selected, and in response connecting the device to a web address where content of the first frame or second frame is found.

9. The method of claim 1, wherein the plurality of frames is oriented in a columnar format with the navigation frame positioned between the content frame and the advertising frame.

10. A method for presenting advertising information on a device in conjunction with requested data, comprising the following steps:

in response to a request to display said data, dividing a display area on said device into at least three frames;

retrieving the requested data from a network resource and displaying said data in one of said frames; and retrieving advertising from an advertising server and displaying said advertising in another one of said frames;

filling the one of said frames, with navigational tools that enables a user to selectively display the data in said content frame or the advertising in said advertising frame, by interacting with the navigation frame.

11. The method of claim 10 wherein said selectively displayed data or advertising is displayed in a window that is distinct from said display area.

12. The method of claim 10 wherein said selectively displayed data or advertising replaces the display of the frames and their contents on said display area.

13. The method of claim 1, wherein each of said plurality of frames has the ability to display an entire web page.

14. The method of claim 10, wherein the sending of the information for causing the filling of the third of said plurality of frame includes at least sending a message having one or more special purpose tags for rendering frames, the one or more special purpose tags being tags that are pre-designated as part of a machine language for creating frames.

15. A system, comprising an exchange server on a network, the exchange server having a processor system and an interface to the network, is the exchange server being responsive to a request for desired content to transmit information to a requesting device that causes a display area on the device to be divided into a plurality of frames, said information including first data that enables said device to retrieve the desired content from a first resource on said network for display in one of said frames as a content frame, and second data that enables said device to retrieve advertising from a second resource on said network for display in another one of said frames as an advertising frame; and     a third one of said plurality of frames includes at least a navigation frame, that is different from the advertisement frame and content frame, where the navigation frame is displayed within the display area in a manner visible to a user that enables the user to selectively display the data in said first frame and the advertising in said second frame in response to the users interaction with one or more visible elements of the navigation frame provided to make a selection.

16. The system of claim 15, wherein said exchange server is comprised of multiple parallel exchange controllers.

17. The system of claim 15, wherein said first and second data each comprise a direct link to said first and second resources, respectively.

18. The system of claim 15, wherein said first and second data comprise references back to said exchange server, and wherein, in response to requests containing said references, said exchange server transmits, to said requesting device, redirect information that causes said device to transmit requests to said first and second resources for said desired content and said advertising, respectively.

19. The system of claim 15, wherein said first and second data comprise references back to said exchange server, and wherein, in response to requests containing said references, said exchange server transmits requests to said first and second resources to obtain said desired content and said advertising, respectively, and in response to receipt thereof from said resources, forwards said desired content and said advertising to said device for display in said frames.

20. The system of claim 15, wherein said device is an HTML rendering device.

\* \* \* \* \*